(12) United States Patent
Dahan et al.

(10) Patent No.: US 8,588,621 B2
(45) Date of Patent: Nov. 19, 2013

(54) SYSTEM AND METHOD FOR GENERATING MULTILEVEL CODED OPTICAL SIGNALS

(75) Inventors: David Jimmy Dahan, Tel-Aviv (IL); Uri Mahlab, Or Yehuda (IL)

(73) Assignee: ECI Telecom Ltd., Petach Tikva (IL)

( * ) Notice: Subject to any disclaimer, the term of this patent is extended or adjusted under 35 U.S.C. 154(b) by 579 days.

(21) Appl. No.: 12/745,948

(22) PCT Filed: May 19, 2008

(86) PCT No.: PCT/IL2008/000681
§ 371 (c)(1),
(2), (4) Date: Jun. 3, 2010

(87) PCT Pub. No.: WO2009/072099
PCT Pub. Date: Jun. 11, 2009

(65) Prior Publication Data
US 2010/0260505 A1 Oct. 14, 2010

(30) Foreign Application Priority Data

Dec. 3, 2007 (IL) .......................... 187836

(51) Int. Cl.
*H04B 10/04* (2011.01)
(52) U.S. Cl.
USPC ........... 398/186; 398/183; 398/198; 359/238; 359/276
(58) Field of Classification Search
USPC .......... 398/183, 198, 140, 141, 186; 359/238, 359/276, 237
See application file for complete search history.

(56) References Cited

U.S. PATENT DOCUMENTS

| 6,067,187 | A | * | 5/2000 | Onaka et al. ............. 359/337.11 |
|---|---|---|---|---|
| 6,577,435 | B1 | | 6/2003 | Bang et al. |
| 6,744,546 | B2 | | 6/2004 | Nakamura et al. |
| 7,110,681 | B1 | | 9/2006 | Mizuochi |
| 2003/0123122 | A1 | | 7/2003 | Nakamura et al. |
| 2004/0213581 | A1 | * | 10/2004 | Okuno .......................... 398/183 |
| 2005/0069330 | A1 | | 3/2005 | Kao et al. |
| 2006/0034617 | A1 | * | 2/2006 | Reintjes et al. ............... 398/186 |

OTHER PUBLICATIONS

Soto et al. "All-optical 2-to-4 level encoder based on cross polarization modulation in a semiconductor optical amplifier utilized to develop an all-optical 2 input digital multiplexer", Optics Express, Optical Society of America, 2006, pp. 1094-4087, vol. 14, No. 20, Washingtoon, DC, USA.*

Soto et al.,"All-optical 2-to-4 level encoder based on cross polarization modulation in a semiconductor optical amplifier utilized to develop an all-optical 2 input digital multiplexer," Optics Express, Optical Society of America, 2006, pp. 1094-4087, vol. 14, No. 20, Washington, DC, USA.

Huo et al.,"Experimental demonstration of a novel all-optical multilevel 4-amplitude-shifted-keying coding/decoding scheme," OFCNFOEC, 1900, p. 3PP.

* cited by examiner

*Primary Examiner* — M. R. Sedighian
(74) *Attorney, Agent, or Firm* — Browdy and Neimark, PLLC

(57) ABSTRACT

A simple and effective all-optical system, producing a multilevel coded optical signal based on the M-ASK technology and by the minimized equipment. The novel all-optical modulation technique for optical M-ASK generation is based on nonlinear interaction between optical signals, say between N 2-ASK modulated pump signals having extinction ratio $ER_1$ and a single 2-ASK modulated optical probe signal having extinction ratio $ER_2$. According to the invention, a 4-ASK optical signal can be obtained using just a single binary modulated pump optical signal and a single binary modulated probe optical signal.

11 Claims, 11 Drawing Sheets

| LEVEL | ER$_2$<G$_C$ | | | ER$_2$>G$_C$ | | |
|---|---|---|---|---|---|---|
| | RELATIVE LEVEL VALUE | DATA 1 (PUMP) | DATA 2 (PROBE) | RELATIVE LEVEL VALUE | DATA 1 (PUMP) | DATA 2 (PROBE) |
| L$_0$ | 1/(G$_C$ER$_2$) | 1 | 0 | 1/(G$_C$ER$_2$) | 1 | 0 |
| L$_1$ | 1/G$_C$ | 1 | 1 | 1/ER$_2$ | 0 | 0 |
| L$_2$ | 1/ER$_2$ | 0 | 0 | 1/G$_C$ | 1 | 1 |
| L$_3$ | 1 | 0 | 1 | 1 | 0 | 1 |
*FIG. 6*
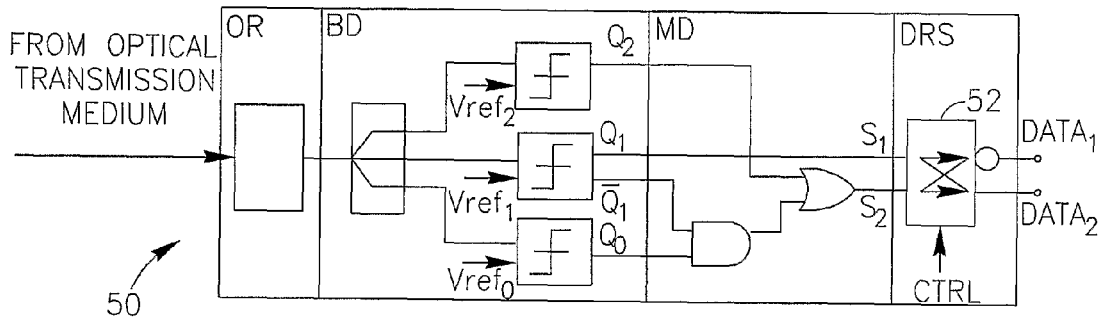
*FIG. 7*
| LEVEL | ER$_2$<A$_C$ | | | ER$_2$>A$_C$ | | |
|---|---|---|---|---|---|---|
| | RELATIVE LEVEL VALUE | DATA 1 (PUMP) | DATA 2 (PROBE) | RELATIVE LEVEL VALUE | DATA 1 (PUMP) | DATA 2 (PROBE) |
| L$_0$ | 1/(A$_C$ER$_2$) | 0 | 0 | 1/(A$_C$ER$_2$) | 0 | 0 |
| L$_1$ | 1/A$_C$ | 0 | 1 | 1/ER$_2$ | 1 | 0 |
| L$_2$ | 1/ER$_2$ | 1 | 0 | 1/A$_C$ | 0 | 1 |
| L$_3$ | 1 | 1 | 1 | 1 | 1 | 1 |
*FIG. 8*
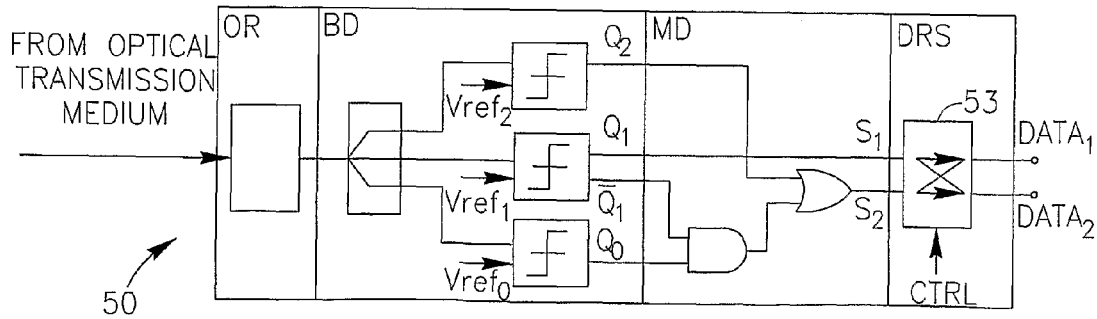
*FIG. 9*

20 Gb/s, NRZ 4-ASK
D=165 ps/nm

20 Gb/s, RZ 4-ASK
D=165 ps/nm

20 Gb/s, NRZ 4-ASK
D=350 ps/nm

20 Gb/s, RZ 4-ASK
D=350 ps/nm

20 Gb/s, NRZ 4-ASK
D=-165 ps/nm

20 Gb/s, RZ 4-ASK
D=-165 ps/nm

SYSTEM AND METHOD FOR GENERATING MULTILEVEL CODED OPTICAL SIGNALS

FIELD OF THE INVENTION

The present invention relates to generation of multilevel coded optical signals, more specifically to a technology using an all-optical multilevel Amplitude Shift Keying (M-ASK) modulation circuit.

BACKGROUND OF THE INVENTION

The increasing traffic demand in optical networks appeals for the development of novel high spectral efficiency optical modulation schemes which would lead to the better use of the available optical bandwidth while increasing the operational bit rate. Increasing the spectral efficiency can be achieved by increasing the number of symbols in a signal constellation diagram via multilevel amplitude and/or phase encoding. Non-binary modulation schemes are a mature technology in wireline and wireless Radio Frequency based systems; their deployment into optical systems has been investigated for the last years.

Multilevel or M-ary amplitude shift keying (M-ASK) technologies, such as four level ASK (noted 4-ASK), offers better tolerance towards chromatic dispersion and Polarization Mode dispersion (PMD) compared to a conventional two level ASK technique (noted 2-ASK). Conventional methods to generate an optical 4-ASK signal are based on the modulation of a Continuous Wave (CW) light by an external modulator controlled by an electrical 4-ASK signal that is obtained by adding one binary signal to another (for example, intensity halved) binary signal.

For example, U.S. Pat. No. 7,110,681 describes a method and apparatus for optical transmission and is related to generation of a 4-ASK optical signal. The generation method is based on the transposition of a 4-ASK electrical signal into a 4-ASK optical signal. In such a configuration, moderate amplitude distortions of the electrical binary signals cause significant distortions of intermediate levels obtained in the resulting optical 4-ASK signal. Signal detection is performed by optoelectronic conversion followed by binary decoder using three reference voltage thresholds and a multilevel decoder.

All-optical methods for obtaining multilevel signals have been suggested to avoid the mentioned distortions.

The concept of all optical modulation is explained, for example, in U.S. Pat. No. 6,577,435. An optical wavelength converter, based on cross-gain modulation with wide input dynamic range, includes a semiconductor optical amplifier, a continuous wave source, and a probe beam controller. The semiconductor optical amplifier modulates probe power on the basis of pump power. The continuous wave source generates the probe beam and supplies the generated probe beam to the semiconductor optical amplifier. The probe beam controller adjusts bias current supplied to the continuous wave source and controls the probe power in proportion to the pump power.

U.S. Pat. No. 6,744,546 B2 describes an optical modulator integrated on a LiNBo3 substrate, optically combining one binary signal and another intensity halved binary signal.

Some all-optical techniques were proposed for optical 4-ASK generation.

For example, one technique is based on nonlinear effects in a semiconductor optical amplifier (SOA) [H. Soto et al. "All optical 2 to 4 level encoder based on cross polarization modulation in a SOA utilized to develop an all optical 2 input digital multiplexer" Optics Express, vol 14, n. 20 (2006)]. Another technique utilizes an electro-absorption modulation (EAM) [L. Huo et al, "Experimental; demonstration of a novel all optical multilevel 4-amplitude shifted keying coding/decoding scheme", OFC 2006, paper JThB41 (2006)]. In both of these techniques, two independent 2-ASK (binary) modulated optical pumps encode a CW probe signal into an optical 4-ASK signal via the use of the cross gain modulation (XGM) and cross polarization modulation (XPo1M) in a SOA, or via the use of the absorption modulation (XAM) in an electro-absorption modulation (EAM) device.

US2005069330AA describes a system and a method for generating multilevel coded optical signals. The technique comprises driving modulators with synchronous data signals having the same data rate to generate a multilevel optical signal using a combination of differential phase shift keying (DPSK) and amplitude shift keying modulation.

A common feature of all optical multilevel modulation methods is the capability of providing all optical aggregation of the data carried at different optical channels, avoiding expensive and complex opto-electronics conversions.

Though, to the best of the Applicant's knowledge, all-optical systems for generating a multilevel coded optical signal by using the M-ASK technology are rather complex, since they comprise multiple signal generating schemes for producing component optical signals which are to be combined for obtaining the required multilevel optical signal. It is presently accepted that in such systems the number of signal-generating schemes linearly grows as $\log 2(M)$, where M is the number of required coding levels.

OBJECT AND SUMMARY OF THE INVENTION

It is an object of the present invention to provide a simple though effective all-optical system, which would allow producing a required multilevel coded optical signal based on the M-ASK technology and by the minimized equipment.

To achieve the above purpose, the Inventors propose a novel all optical modulation technique for optical M-ASK (M-ary) generation based on nonlinear interaction between optical signal(s) produced, say, by N 2-ASK (binary) modulated pumps having extinction ratio $ER_1$ and a single 2-ASK (binary) modulated optical probe signal having extinction ratio $ER_2$. Those nonlinear interactions can be, for example, in the form of cross-gain modulation XGM performed in a SOA, or a Raman amplifier characterized by a gain compression factor/parameter noted Gc. Alternatively, the non-linear medium can be an electro-absorption modulation (EAM) device or a non-linear optical fiber (for example, a Raman amplifier), for performing the non linear interaction Cross Absorption Modulation (XAM) between the optical signals applied to the medium characterized by an absorption compression factor/parameter noted Ac.

According to the invention, a 4-ASK optical signal (i.e., M=4) can be obtained using just a single binary modulated pump optical signal and a single binary modulated probe optical signal.

The pump optical signal should be understood as a binary signal, the highest optical power of which is high enough to cause saturation of a specific nonlinear medium. The lowest optical power of the pump optical signal may cause slight saturation (but at the extent lower than that induced by the highest optical power). In practice, the pump signal is usually a Non Return to Zero (NRZ) modulated binary signal.

The probe optical signal can be defined as a binary signal such that its highest optical power is lower than the highest pump signal's optical power. The probe signal can be either a NRZ or RZ modulated binary signal. The highest optical power of the probe signal is preferably selected to be either low enough not to cause by itself saturation of the specific nonlinear medium, or such as to cause some degree of saturation of that nonlinear medium, being still lower than that caused by the pump signal. In the presence of the pump signal and in any binary combination with the pump signal, the probe optical signal should undergo the XGM or the XAM modulation in the non-linear medium. Actually, the probe signal is used to transpose saturation in the medium.

The novelty of the proposed technique stems both from the selected configuration of the circuit and from the very fact and the character of the probe signal modulation. At least one of the mentioned optical signals should be controllable (for example, synchronized, power controlled and/or controlled from the point of extinction ratio, etc.).

It has been found by the Inventors that the modulated probe signal having a controllable ER ($ER_2$) chosen with reference to a relevant compression factor (parameter), allows not only minimizing the required equipment for ensuring those optical levels, but also controlling and optimizing a proportion between the multiple optical levels in the obtained optical signal.

Moreover, under specific working conditions (e.g., for a plurality of specifically defined combinations of $ER_2$, probe signal input power, and Gc/Ac values, where Gc is Gain compression parameter and Ac is Absorption compression parameter), the levels distribution and the quality of the obtained multilevel coded signal can be significantly improved in comparison with the prior art methods.

The pump signal can be obtained from, say, a transmission line, or generated by a single binary modulated basic optical pump—instead of two such pumps in a conventional all optical modulation scheme. The same relates to the binary modulated probe signal.

Preferably, at least one of the signals (for example, the probe signal) should be generated in the system; to have the controllable $ER_2$.

For generating an 8-ASK optical signal, the inventive system requires obtaining two optical pump signals, for example two binary modulated basic optical pumps (instead of three such basic pumps in a conventional all optical modulation scheme) and obtaining a single binary modulated probe signal, preferably with a possibility to control $ER_2$.

More generally, an M-ASK optical signal can be obtained using $N=(\log_2 M)-1$ pump optical signals (say, from N binary modulated optical pumps, transmission lines, etc.) and a single binary modulated probe signal which can analogously be produced by another binary modulated optical pump, transmission line, etc.

Speaking formally, the invention can be defined in terms of a system and in terms of a suitable method.

According to a first aspect of the invention, the above object can be achieved by providing a system for generating an M-level coded optical signal using M-ASK all-optical modulation technology, the system comprising:

N sources for obtaining N respective 2-ASK (binary) modulated pump optical signals having similar values of extinction ratio noted $ER_1$ a source for obtaining a binary modulated probe optical signal with an extinction ratio noted $ER_2$
control/processor means for controlling said N pump optical signals or/and said probe optical signal;
a non-linear medium for generating the required M-level coded optical signal, by performing either Cross-Gain Modulation (XGM) or Cross-Absorption Modulation (XAM) with a compression parameter (gain compression Gc for XGM and absorption compression Ac for XAM), when applying to said medium N said 2-ASK modulated optical pump signals and the binary modulated probe optical signal,
wherein:
$M=2^K$,
K is an integer,
$N=K-1$.

The term "source for obtaining a binary modulated optical signal" in this patent application should be understood as any means allowing to obtain a binary modulated optical signal for the described system. It may be a transmission line or just an input port for receiving such a signal from an outside location or a remote site; however, it may be a single binary modulated basic optical pump for generating the binary modulated optical signal within the system.

The most important embodiment of the system is a system for generating a 4-level optical signal using 4-ASK all-optical modulation technology (i.e., M=4).

The proposed system for generating a 4-ASK optical signal from the two above-described optical signals is extremely advantageous for optical networks.

Since the multilevel optical signal is always obtained at a wavelength of the probe signal, and since two initial binary signals may be transmitted at two different wavelengths, a user can selectively assign the probe signal to the wavelength at which the user wishes the multilevel signal to be generated, and to suitably regulate the power of the probe signal with respect to the power of the pump signal.

Thereby, the control means of the system is preferably adapted to select which of the initial binary signals will be the probe signal and which will be the pump signal, and therefore further adapted to suitably control the initial signals.

It should be noted that the two initial signals may be applied to the non-linear medium in one direction (a co-propagating principle), or in two opposite directions (a counter-propagating principle).

When both the probe optical signal and the pump optical signal are obtained at the same optical wavelength and applied to the non-linear medium in opposite directions (counter-propagation), it enables combining two data streams transmitted at that specific wavelength into a resulting four level optical signal transmitted at the same specific wavelength. Such a possibility allows reduction of a number of optical channels operating at one specific wavelength, that is advantageous from the point of non-blocking transmission, from the point of required equipment, etc.

Preferably, the extinction ratio $ER_2$ of the probe optical signal is controllable by the control means.

Further preferably, the system is to be capable of regulating the extinction ratio $ER_2$ in combination with a value of compression parameter of the non-linear medium, and adapted to controllably select optimal combinations of the extinction ratio $ER_2$ and values of the compression parameter of the mentioned non-linear medium (being either a gain compression parameter Gc for XGM or absorption compression Ac for XAM).

The above function allows achieving desired (optimal) gaps between multiple levels of the obtained multilevel optical signal.

Also, the system may be adapted to regulate the extinction ratio $ER_1$ of the N binary modulated pumps.

Further preferably, the control means/microprocessor of the system should be capable of controllably regulating optical power of at least one of the probe optical signal and the pump optical signal(s).

In the case of a 4-ASK multilevel optical signal (four level optical signal) the control means should be designed to be capable of:

selecting a combination of a value of the probe signal extinction ratio $ER_2$ and a corresponding value of the compression parameter Gc or Ac, the combination being selected in one of two working regions, wherein in one of said working regions the compression parameter is higher than $ER_2$, while in the other of the working regions the compression parameter is lower than $ER_2$, wherein both the compression parameter and $ER_2$ are measured in dB;

encoding the 4-ASK optical signal in accordance with the selected working region; and regulating the system in accordance with the selected combination.

The compression parameter can be controlled/regulated by regulating/controlling power of the pump optical signal(s).

The above-mentioned two working regions can be optimized for obtaining optimal gaps between four levels of the 4-ASK multilevel optical signal. The optimal working regions can be graphically presented in the form of elongated areas formed close to centers of two triangles created by a bisectrix of the quadrant formed by values, measured in dB, of the probe signal extinction ratio on one axis and the compression parameter (GC for XGM or THE AC for XAM) on the orthogonal axis, said elongated areas being mutually symmetrical with respect to the bisectrix and situated higher than a line of a minimal acceptable extinction ratio of the 4-ASK signal.

For the 4-ASK multilevel optical signal, the system should preferably be adapted to operate at two different practical working regimes:

for low to moderate extinction ratio $ER_2$ of the probe signal (e.g., for a range from about 3.5 to about 7 dB) the corresponding compression ratio (gain or absorption) should be selected somewhere between values of about 6.5 to 10, forming a lower optimal region LOR;

for moderate to high extinction ratio $ER_2$ of the probe signal (e.g., for a range from about 6 to about 10.5 dB), the corresponding compression ratio (gain or absorption) should be found somewhere between values of about 3.5 to 7, forming a higher optimal region HOR.

Positions of the two optimal working regions additionally depend on a number of initially selected criteria, which will be discussed in the detailed description.

According to a second aspect of the invention, there is provided a suitable method for producing a multilevel (M-level) optical signal using M-ASK all-optical modulation technology, the method comprising steps of:

obtaining N 2-ASK modulated, pump optical signals having similar values of extinction ratio $ER_1$;

obtaining a binary modulated probe optical signal having extinction ratio $E_2$; controlling at least one of said N pump optical signals and said probe optical signal;

combining the N 2-ASK modulated optical pump signals and the binary modulated probe optical signal in a non-linear medium to obtain the required M-level coded optical signal, wherein:

$M=2^K$,

K is an integer, $N=(\log_2 M)-1=K-1$ and wherein the non-linear medium is capable of performing either cross-gain modulation (XGM) or cross-absorption modulation (XAM) characterized by a compression parameter denoted Gc or Ac respectively.

The method preferably comprises selecting a value of the extinction ratio $ER_2$ of the binary modulated probe optical signal and a value of the compression parameter in a combination ensuring operation in one of two optimal working regions to obtain optimal gaps between M levels of said multilevel optical signal.

The method may further comprise other operations and steps described above with reference to the technique in general and the system in particular.

As has been mentioned earlier in the summary, the pump signal can be an NRZ modulated signal while the probe signal can be either an NRZ or an RZ modulated binary signal.

A resulting NRZ M=ASK signal can be obtained when using NRZ binary modulated pump signals and an NRZ binary modulated probe signal. A resulting RZ M-ASK signal can be obtained when using NRZ binary modulated pump signals and an RZ binary modulated probe signal.

The above-mentioned combinations have been checked by the Inventors and are correct at least for M=4.

In some specific cases, the discussed technique for obtaining multilevel coded signals can be combined with phase modulation schemes such as DPSK or Differential Quadrature Phase Shift Keying (DQPSK) to provide the modulation schemes with higher spectral efficiency, since the technique proposed in the present application enables generating a multilevel coded signal with controllable extinction ratios and levels.

The invention will be explained and illustrated in more details as the description proceeds.

BRIEF DESCRIPTION OF THE DRAWINGS

The invention will be described below with reference to the following non-limiting drawings in which:

FIG. 6 shows a table of the coding map of a 4-ASK optical signal generated using the XGM approach (for the case where the probe signal itself does not cause saturation of the non-linear medium).

FIG. 7 schematically illustrates the 4-ASK demodulating circuit with the XGM approach.

FIG. 8 shows a table of the coding map of a 4-ASK optical signal generated based on the XAM approach (for the case where the probe signal itself does not cause saturation of the nonlinear medium).

FIG. 9 schematically illustrates the 4-ASK demodulating circuit with the XAM approach.

FIGS. 12a, 12b illustrate different level distributions in the multilevel signal, and for each distribution one can see eye diagrams of the NRZ signal and RZ signal.

DETAILED DESCRIPTION OF THE PREFERRED EMBODIMENTS

Figure 1:
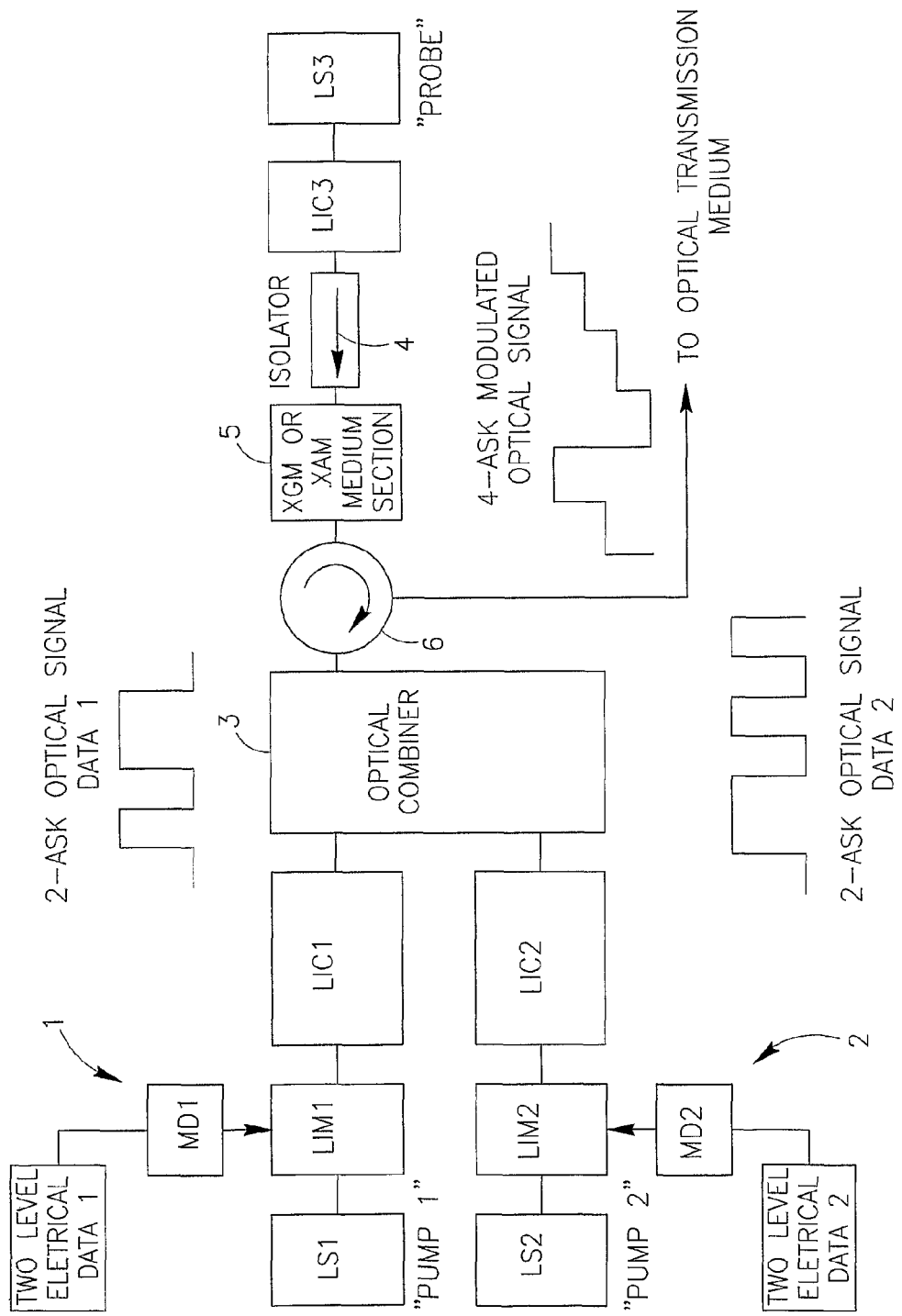
FIG. 1 (prior art) shows an example of a conventional all optical modulating circuit based on XGM or on XAM, for generation of an optical 4-ASK signal.

FIG. 1 illustrates a system, which has been briefly referred to in the Background description. Two generators 1 and 2 of optical pump signals respectively comprise light sources LS1 and LS2 of two different wavelengths each modulated by two-level electrical data. Each of the two-level data is fed via a modulator driver MD1 (MD2), applied to the carrier wavelength in a light intensity modulator LIM1 (LIM2), and intensity of the two-level signal is controlled by a controller LIC1 (LIC2). The two obtained 2-ASK optical signals are combined in an optical combiner 3.

A probe optical signal LS3 generates an optical signal at yet another optical wavelength, which is regulated by a light intensity controller LIC3 and then, via an isolator 4, fed into a non-linear XAM or XGM medium section 5. In the section 5 the probe signal meets with the combined light signal applied to the section 5 via an optical circulator 6 (thus using two of three ports of the circulator).

The 4-level (4-ASK) optical signal is obtained at a third port of the circulator 6 at the wavelength of the probe signal.

Figure 2:
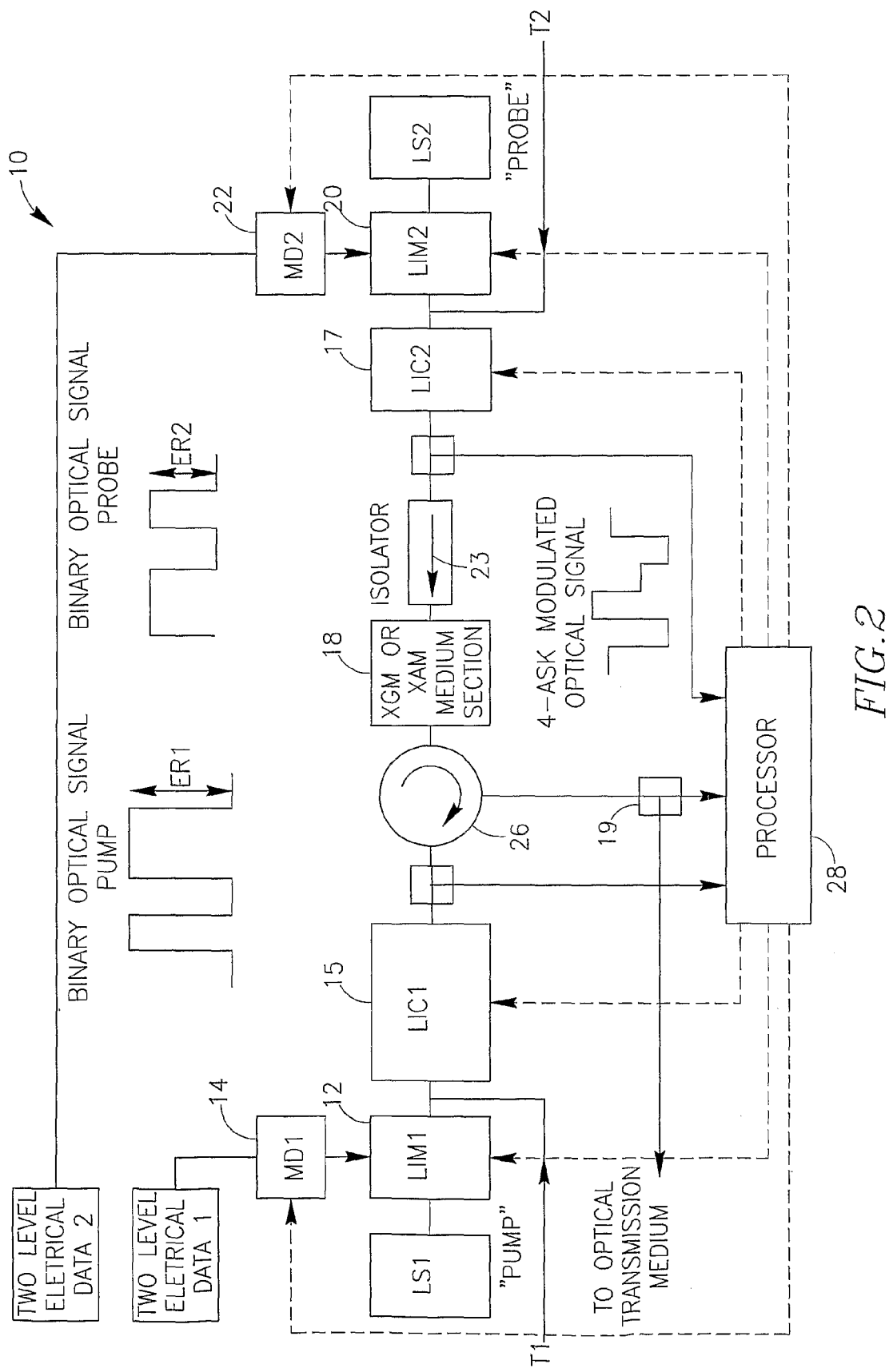
FIG. 2 schematically illustrates one embodiment of the inventive system being a modulating circuit based on non-linear modulation in a non-linear medium, with a counter propagating approach between the pump and the probe, for producing a 4-ASK optical signal.

FIG. 2 exhibits a modulating circuit 10 based on XGM (in an SOA for example) or based on XAM (in an EAM for example) for generation of an optical 4-ASK signal using two counter propagating signals—a pump signal and a probe signal. A signal from a light source 1 (LS1) serving as the pump signal, is modulated using a light intensity modulator 12 controlled by an electrical binary signal Data 1 (14) at a bit rate B. The pump signal from LS1 exhibits a high extinction ratio $ER_1$, and its optical power level is set in block 15 to reach the desired power at the input of a non-linear medium section 18 to cause some specific level of saturation, for utilizing the XGM (or XAM) processes. In other words, the $ER_1$ and the power of the pump signal are always selected so that the "1" level of the pump signal causes saturation in the XGM or XAM medium section while the "0" level does not cause saturation, or at least a much lower saturation extent than the one caused by the "1" level. It is recommended by the Inventors, that working values of the pump extinction ratio $ER_1$ be higher than 10 dB and that the needed extinction ratio $ER_1$ increases with the saturation factor, according to the response of the nonlinear medium section 18.

The pump signal, however, may be a remote signal arriving from another, distant location in the network (for example, from a transmission line T1). In such a case, this remote pump signal can be directly sent to the block 15 for optical power control.

A second signal from a light source 2 (LS2), serving as the probe signal, is modulated using a light intensity modulator 20 controlled by an electrical two-level signal called Data 2 (marked 22, having the same bit rate B and being synchronized with Data 1). The light intensity modulator 20 is controlled to provide a desired extinction ratio $ER_2$ of the probe signal.

The probe signal power is applied to a nonlinear medium section 18 in the direction opposite to the direction of the pump signal (i.e., it is counter-propagating), and is optically controlled in block 17. The power of the probe signal can be selected to be low enough so as not to cause saturation of the XGM or XAM medium section, wherein "1" of the probe signal coincides with "0" of the pump signal. However it can also be feasible to choose the probe signal power so that it can lead, in the XGM or XAM medium section, to a slight saturation level (but less than the saturation induced by the pump signal).

The probe and the pump signals' parameters (powers and/or extinction ratios $ER_1$ and $ER_2$) can be controlled/adjusted so as to reach the desired split between the obtained levels of the multilevel optical signal.

An optical isolator 23 serves to block the pump signal at its output from the SOA (or EAM); an optical circulator 26 is placed to separate the input pump signal from the resulting 4-ASK signal.

The counter-propagating type of the proposed 4-ASK system is advantageous in that it allows choosing the probe signal to be at any wavelength (even the same as the pump), allows choosing the wavelength of the resulting 4-ASK signal and does not require additional modules, such as an optical filter, which would be necessary in co-propagating systems.

The described system for generating a 4-ASK optical signal, where the probe optical signal and the pump optical signal are counter-propagating (applied to the non-linear medium in opposite directions), is functional even if the two signals are obtained at the same optical wavelength. Such a version enables reduction of a number of optical channels operating at a specific wavelength, thus allowing to combine two data streams transmitted at that specific wavelength into a resulting four level optical signal transmitted at the same specific wavelength. That possibility is advantageous for achieving non-blocking transmission. Moreover, such an arrangement allows selecting freely which of the two sources is to be used for obtaining the pump signal and which—for obtaining the probe signal.

On the other hand, if in the counter-propagating system the probe optical signal and said pump optical signal are obtained at different optical wavelengths and applied to the non-linear medium in opposite directions, the system allows obtaining the multilevel signal at any wavelength selected out of the two.

Whether the two wavelengths are different or the same, the system is preferably arranged so that, upon specifying the wavelength and the source at which the resulting signal is to be generated, the control unit (say, processor 28) ensures that the specified wavelength and the specified source are used for providing the probe signal (by suitably regulating parameters of the signal at the specified source with respect to parameters of the second, pump signal).

The technique according to the invention comprises a processor unit (marked 28 in this specific drawing) for regulating one or more of important parameters: extinction ratio $ER_1$ of the binary modulated pump optical signal, $ER_2$ of the binary modulated probe optical signal, the optical power of the pump and the probe for achieving desired gaps between multiple levels of the obtained multilevel optical signal. In FIG. 2, the processor unit 28 receives a fraction of the modulated pump and probe signals from the outputs of the light intensity controller units LIC 15 and LIC 17 via associated tap couplers, and derives information of the power and extinction ratio of these signals. By monitoring a fraction of the resulting multilevel modulated optical signal obtained from a tap coupler 19, unit 28 evaluates the resulting levels distribution. Based on the received information, the processor unit 28 controls/adjusts:

the pump extinction ratio $ER_1$, via control of the modulator driver MD 14 and light intensity modulator LIM 12.

the probe extinction ratio $ER_2$, via control of the modulator driver MD 22 and light intensity modulator LIM 20 the pump power launched into the nonlinear medium section 18, by controlling the light intensity controller LIC 15 the probe power applied to the nonlinear medium section 18, by controlling the light intensity controller 17.

In the case of a remote (obtained from another location) pump signal, the processor unit 28 cannot control/adjust the pump extinction ratio $ER_1$. However, taking into account its monitored $ER_1$ value and the probe extinction ratio $ER_2$, the control unit will be adapted to control/adjust the pump power to get the necessary (optimized) compression factor.

Schematic simplified time diagrams shown in FIG. 2 illustrate the pump signal having relatively a high extinction ratio $ER_1$, the probe signal having a lower extinction ratio $ER_2$, and the resulting 4-level optical signal.

Figure 3:
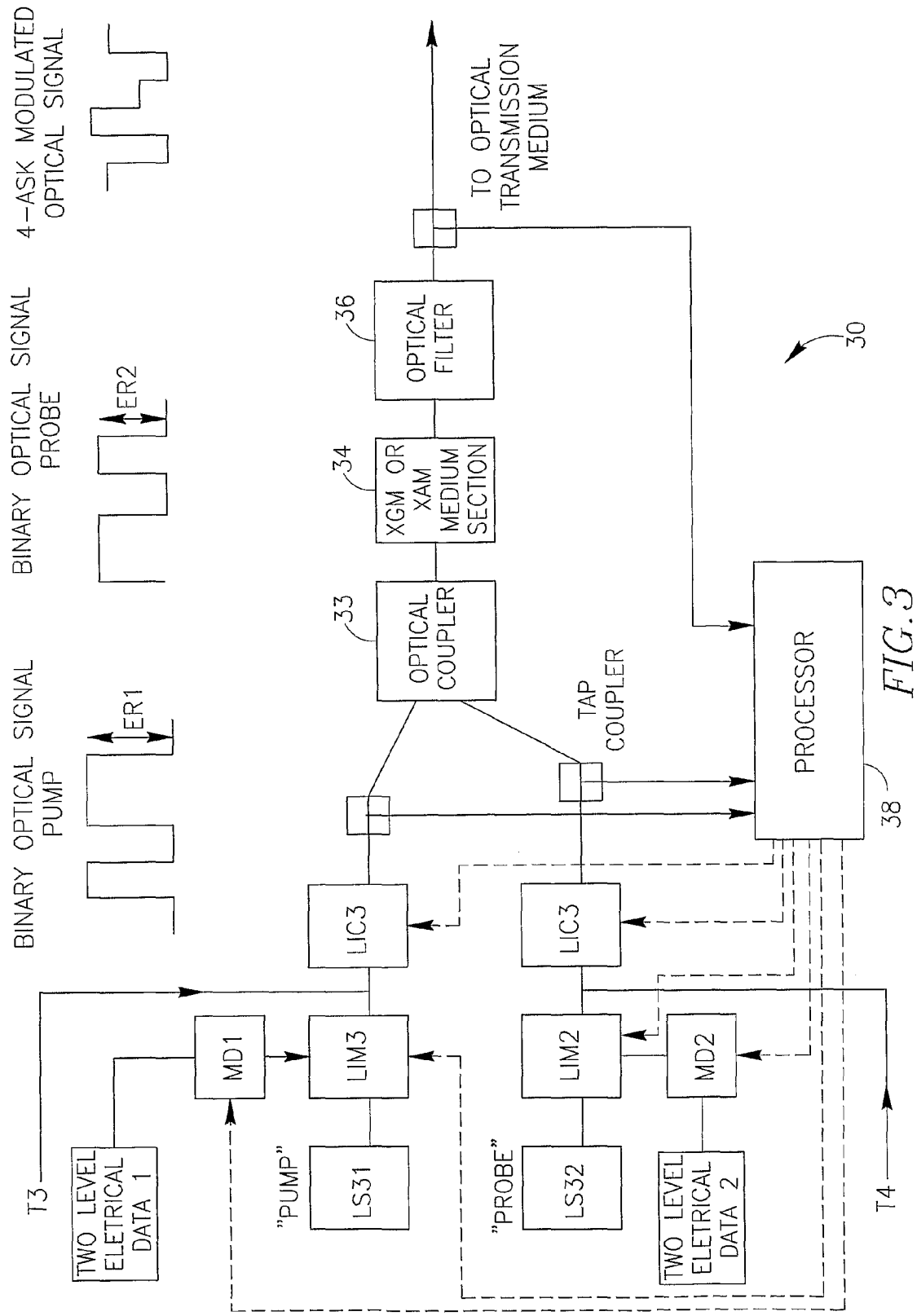
FIG. 3 schematically illustrates one embodiment of the inventive system being a modulating circuit based on non-linear modulation in a non-linear medium, with a co-propagating approach between the pump and the probe signals, for producing a 4-ASK optical signal.

Another embodiment of the proposed modulating circuit is illustrated in FIG. 3 which exhibits a modulating circuit 30 based on XGM (for example, SOA) or based on XAM (for example, EAM) for generation of an optical 4-ASK signal using a co-propagating approach. In this case, optical signals from the modulated pump LS 31 and the modulated probe LS 32 are combined via an optical coupler 33 and introduced in the nonlinear medium section 34 in one and the same direction (i.e., the signals are co-propagating). At the output of the nonlinear section, the resulting multilevel modulating signal, which is always obtained at the probe wavelength, is selected while the pump signal's wavelength is rejected with the aid of an optical filter F 36. In the co-propagating system, the pump and the probe signals cannot have the same wavelength. Like in the preceding embodiment, a processor unit 38 is used to regulate the extinction ratio ER1 of the binary modulated pump optical signal, $ER_2$ of the binary modulated probe optical signal, as well as to regulate the optical power of the pump and the probe for achieving desired quality (gaps between multiple levels) of the obtained multilevel optical signal.

Figure 5A:
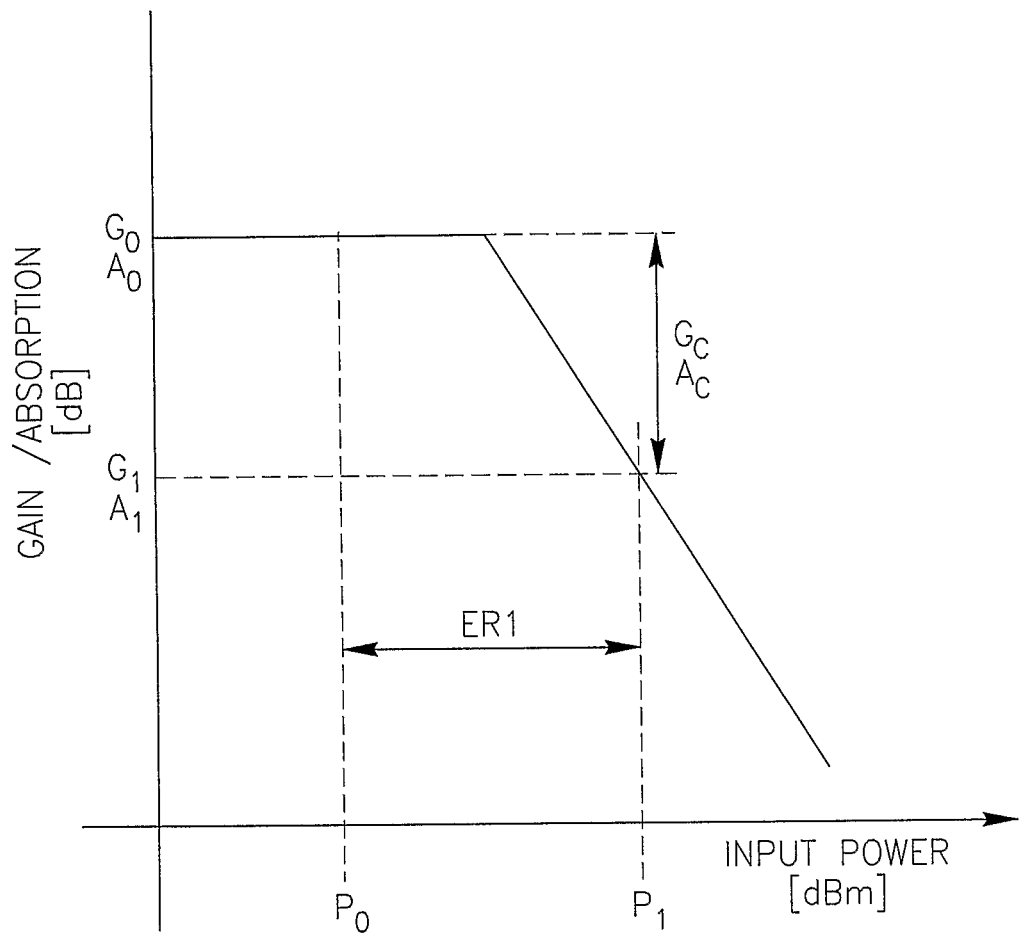
FIG. 5 schematically illustrates the principle of operation of the modulating circuit based on XGM and on XAM approaches (on the example of an NRZ 4-ASK signal generation, where the probe signal itself does not cause saturation of the nonlinear medium).

Here again, the pump signal can be a remote optical signal arriving from another location in the network (say, from a transmission line T3). In such a case, this remote signal is directly sent to the light intensity controller LIC3 for optical power control. The processor unit 38 cannot control/adjust the pump extinction ratio but according to its monitored value and the power extinction ratio $ER_2$, it will control/adjust the pump power to get the optimized compression factor (FIG. 5a illustrates dependency therebetween).

Actually, the probe signal may as well be received from outside of the system (line or port T4). However, it is desired that one of the signals have the controllable extinction ratio, so one of the signals is preferably generated in the system.

In the co-propagating system, the probe optical signal and the pump optical signal must be obtained at different optical wavelengths. The Inventors noted that such a system, if suitably adapted, would allow obtaining the multilevel signal at any wavelength selected out of the two.

The system is preferably arranged so that, upon choosing the wavelength at which the resulting signal is to be generated, the control unit (say, processor 38) ensures that the selected wavelength (found at one of the sources) is used for carrying the probe signal, and then suitably regulates parameters of that signal with respect to parameters of the second signal considered to be the pump signal.

Figure 4:
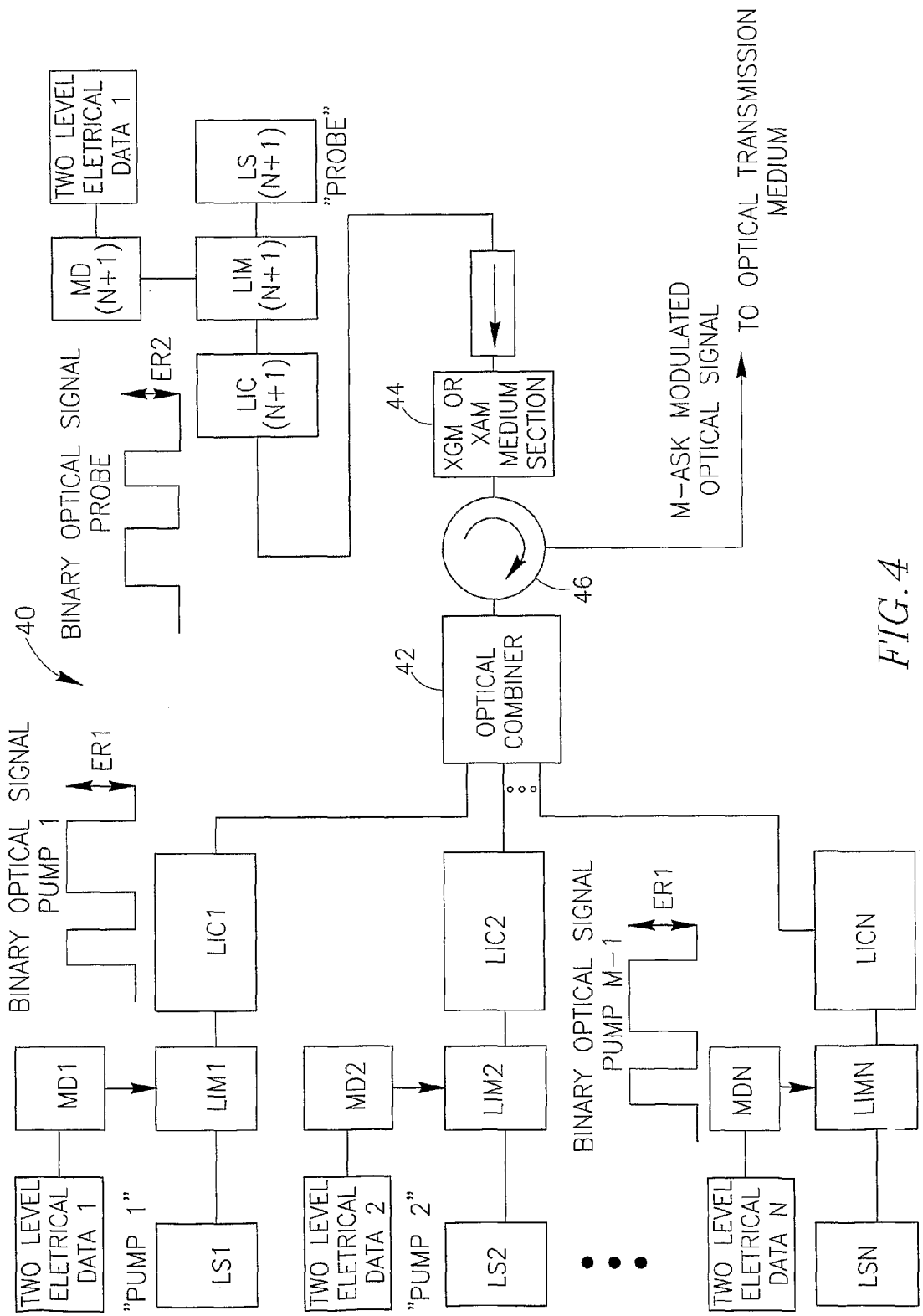
FIG. 4 schematically illustrates one embodiment of the inventive modulating circuit based on non-linear modulation in a non-linear medium for producing an M-ASK optical signal in counter-propagating approach between the pumps and the probe.

FIG. 4 illustrates a generalized embodiment 40 for obtaining an M-ASK multilevel optical signal. In this embodiment, N binary modulated pumps LS 1 . . . LS N [where $N=(\log_2 M)-1$] with quite high extinction ratio signals (shown schematically as $ER_1$) are combined together using an optical combiner 42. The optical power of each pump signal is set using a light intensity controller LIC (for attenuation or amplification), so that each "1" level of the pump signals causes a specific level of saturation in the SOA or EAM and the combination of the N pump signals creates M/2 levels of saturation. A binary modulated probe signal provides additional two levels of saturation, so in combination they give the desired M levels of the multilevel signal. The probe signal is generated by a light source LS(N+1) and is binary modulated in the light intensity modulator LIM (N+1) at a moderate extinction ratio (shown schematically as $ER_2$). The probe signal is introduced into the non-linear medium section/device 44 in the direction opposite to that of the pumps signals, after its optical power is set to ensure no saturation effect in the active device 44. An optical circulator 46 enables to separate the resulting M-ASK signal from the incoming pump signals.

Alternatively, the M-ASK multilevel signal be obtained using a fully co-propagating scheme (similar to the system described in FIG. 3), but it will then require an optical filter to separate the resulting M-ASK signal from the pump signals' wavelengths. As has been mentioned, FIG. 4 illustrates a counter-propagating version of the proposed system. It should be added that the counter-propagating feature of the system can be utilized at even a greater extent. Namely, some of the N pump signals, which are shown in the figure as co-propagating signals generated by sources LS1-LSN, may be applied to the non-linear medium 44 in the direction of the probe signal. In such a case an optical filter should be used to select the probe signal at the circulator output. However, if up to (N/2)−1 pump signals are co-propagating with the probe signal, such an arrangement will become more economic since it would allow essential reduction of the number of required wavelengths.

As in the preceding embodiments, a control/processing unit (not shown) can be adapted to regulate the extinction ratio $ER_1$ of the N modulated pump signals, $ER_2$ of the binary modulated probe optical signal. The processor preferably regulates also the optical power of the N pump signals and of the probe signal. According to the invention, the processor is adapted to finally achieve desired gaps between multiple levels of the obtained multilevel optical signal.

The principle of operation of the modulating circuit based on XGM and on XAM approaches is illustrated by time diagrams shown in FIGS. 5a-5d, for the case of NRZ 4-ASK signal generation, and assuming that the probe signal power does not lead to any saturation of the nonlinear medium by itself.

FIG. 5a shows the Gain/Absorption dependence on the input optical (pump) power in a nonlinear medium section (can be a SOA or an EAM for example); the measurement units are in dB/dBm (for such units ER1=P1−P0). By changing the pump power, one may change the compression parameter Gc or Ac.

Figure 5B:
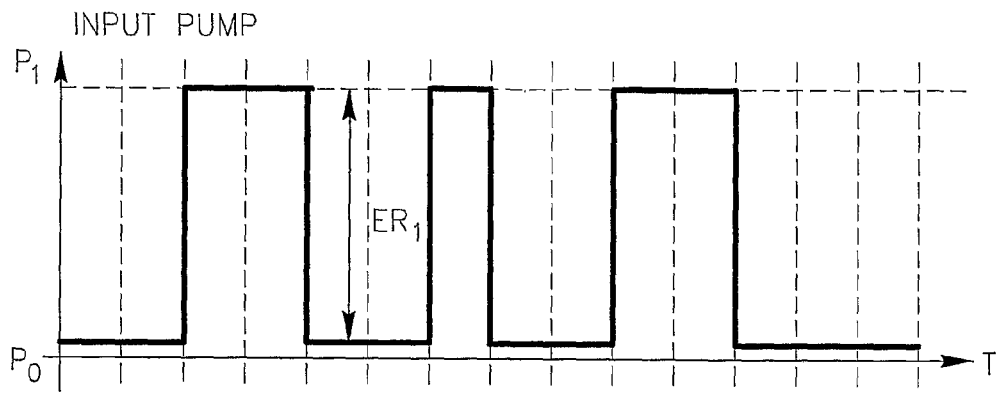
Figure 5C:
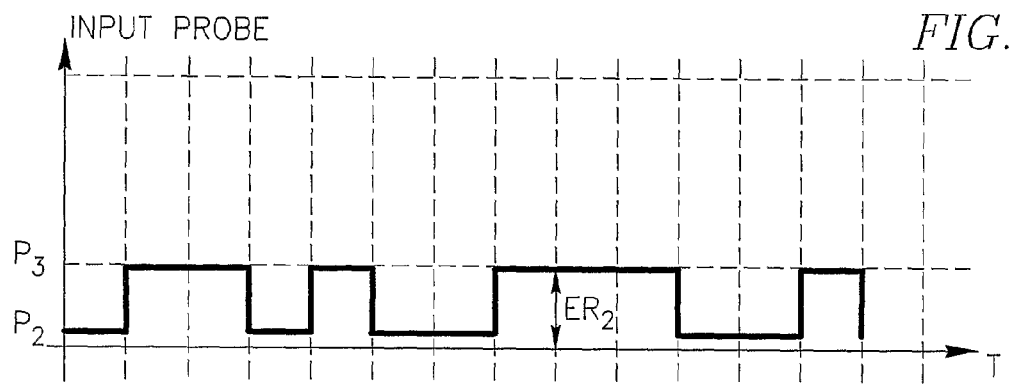
Figure 5D:
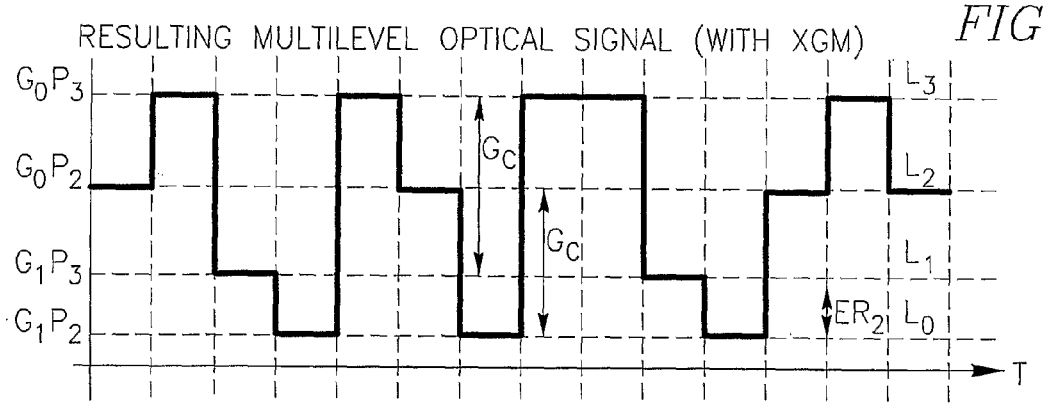

FIG. 5b shows an NRZ pump signal's input pattern, the measuring units are linear (in W);

FIG. 5c shows an NRZ probe signal's input pattern, measurement units are W;

FIG. 5d gives an example of an NRZ 4-ASK pattern of the resulting multilevel output signal, generated using the cross-gain modulation (XGM) in a nonlinear medium (for example SOA) based on the above (5b and 5c) input pump and probe patterns, in the case where GC>ER2; power measurement units are Watt (W).

Figure 5E:
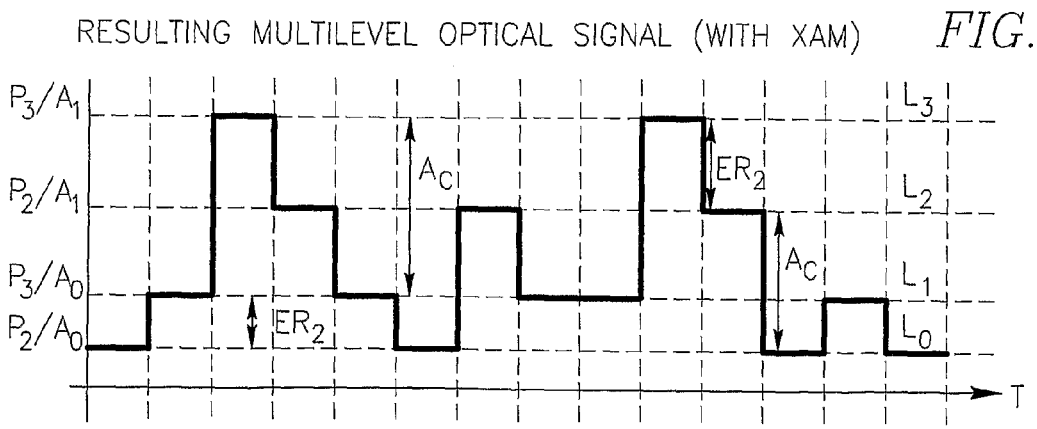

FIG. 5e is an example of an NRZ 4-ASK pattern of the resulting multilevel output signal generated using the cross-absorption modulation (XAM) in a nonlinear medium (for example an EAM,) according to the same above input pump and probe patterns in the case where $A_C$>$ER_2$; power units are W.

It should be noted that for linear measurement units (here, W), the following definitions are used: $A_C=A_0/A_1$, $G_C=G_0/G_1$, $ER_2=P_3/P_2$. For measurement units in dB, the following suitable definitions are used: $A_C=A_0-A_1$, $ER_1=P_1-P_0$, $ER_2=P_3-P_2$.

The pump signal has a high extinction ratio (see FIG. 5b for both XGM and XAM approaches), so that for XGM approach its "zero" power level $P_0$ enables operation of the amplifier with a high optical gain $G_0$. The "one" power level, $P_1$ is chosen to be high enough to saturate the gain at the level $G_1$<$G_0$. We define $G_C=G_0/G_1$ as the gain compression factor. The probe signal has a moderate extinction ratio (see FIG. 5c), $ER_2=P_3/P_2$, where $P_2$ denotes the "zero" power level and $P_3$ the "one" power level of the probe. The probe power is set so that $P_3$ does not lead to any gain compression by itself (when "1" of the probe signal coincides with "0" of the pump signal.)

The two possible levels of the probe combined with the two possible gain levels induced by the two pump power levels provide the 4 possible combinations for the 4-ASK signal generation (see FIG. 5d).

In the XAM approach, the pump signal has a high extinction ratio (see FIG. 5b) so that its "zero" power level, P0 enables the absorber to operate with high optical absorption ratio $A_0$. The "one" power level, $P_1$ is chosen to be high enough to saturate the absorption to a lower level $A_1$<$A_0$. We define $A_C=A_0/A_1$ as the absorption compression factor. Here again, the probe signal has a moderate extinction ratio, $ER_2$ (see FIG. 5c). The two possible levels of the probe combined with the two possible absorption levels induced by the two pump power levels provide the 4 possible combinations for the 4-ASK signal generation (see FIG. 5e).

As shown in FIGS. 5d and 5e, for the same pump and probe input pattern, the output pattern of the 4-ASK signal differs with the XGM and XAM approaches.

FIG. 6 is a table being a coding map of 4-ASK generated signal with the XGM approach. We denote the four levels $L_0$, $L_1$, $L_2$ and $L_3$ are the four levels of the 4-ASK signal (in the increasing order). The symbols corresponding to intermediate levels $L_1$ and $L_2$ can switch each other (change intermittently) depending on the ratio of $G_C$ and $ER_2$, as shown in FIG. 6.

The relative level values are given for the case the probe signal itself does not lead to the saturation of the nonlinear medium.

The extinction ratio of the resulting 4-ASK signal is defined as $ER_{4ASK}=L_3/L_0=G_C ER_2$ in the case of XGM approach. The values of $ER_2$, $G_C$ will determine amplitudes (heights) of the different levels. They can be controlled/regulated through the processor unit by affecting the probe and the pump signals.

However, the Inventors have found that it is possible to get the same level heights distribution by varying values of $ER_2$ and Gc either in a first working region where $ER_2$>Gc or in a second working region where $ER_2$<Gc. In the analogous mariner, two similar working regions exist for $ER_2$>Ac and $ER_2$<Ac.

As shown in Figure (table) 6, intermediate different levels of the multilevel signal are encoded differently, depending on the relation between the selected values of ER2 and Gc (or depending on the selected working region). This different encoding requires a specific arrangement at the receiver side, as shown in FIG. 7.

FIG. 7 illustrates a data recovery switch unit 50 which comprises an optical receiver OR, a binary decoder BD, a multilevel decoder MD and a data recovery switch DRS. The unit 50 enables recovering of the binary digital code of a received multilevel optical signal with the aid of a switch control unit 52. The switch control unit 52 should be informed about a type of the selected combination between the compression parameter and $ER_2$; the information may be presented as an indication of the working region/regime ay which the 4-ASK signal has been generated (either with $ER_2$>Gc or $ER_2$<Gc). To do that, the switch control signal marked CTRL can be sent with the multilevel optical signal as a dithering tone, or can be handled at the management layer of the optical network. Since in our example the 4-ASK is generated via XGM approach, a NOT gate (see the Data 1 gate) is used to recover one of the two data streams from the optical signal.

FIG. 8 is a table being a coding map of a 4-ASK optical signal generated with the XAM approach. We denote the four levels $L_0$, $L_1$, $L_2$ and $L_3$ to be the four levels of the 4-ASK signal (in the increasing order). As can be seen, the binary symbols corresponding to intermediate levels $L_1$ and $L_2$ change intermittently, depending on the working regime (or a combination between a value of $ER_2$ and a value of Ac). The extinction ratio of the resulting 4-ASK signal is defined as ER4-ASK=$L_3/L_0$=$A_C ER_2$ in the case of XAM approach.

The relative values of levels are given for the case where the probe signal itself does not lead to saturation of the nonlinear medium. The values of $ER_2$, $A_C$ will determine heights of different levels of the resulting signal. The heights can be controlled/regulated through the processor unit by affecting the pump and the probe signals.

It should be noted that one may get the same levels' heights distribution by interchanging the values of $ER_2$ and Ac (by selecting one or another working region). As shown in FIG. 8, the intermediate different levels are encoded differently, depending on the relation between a value of $ER_2$ and a value of $A_C$. This requires arrangement of a decoder at the receiver side (shown in FIG. 9), adapted to react on the selected type of encoding which was, in turn, dictated by the selected combination of $ER_2$ and $A_C$.

In FIG. 9, the data recovery switch unit 50 differs only by the switch 53. It enables recovering of data from the multilevel signal by using a switch control signal CTRL which indicates in which working regime the 4-ASK signal has been generated (either with $ER_2$>$A_C$ or $ER_2$<$A_C$). As already mentioned, the switch control signal CTRL can be sent with the optical signal as a dithering component or can be issued at the management layer of the optical network.

Figure 10:
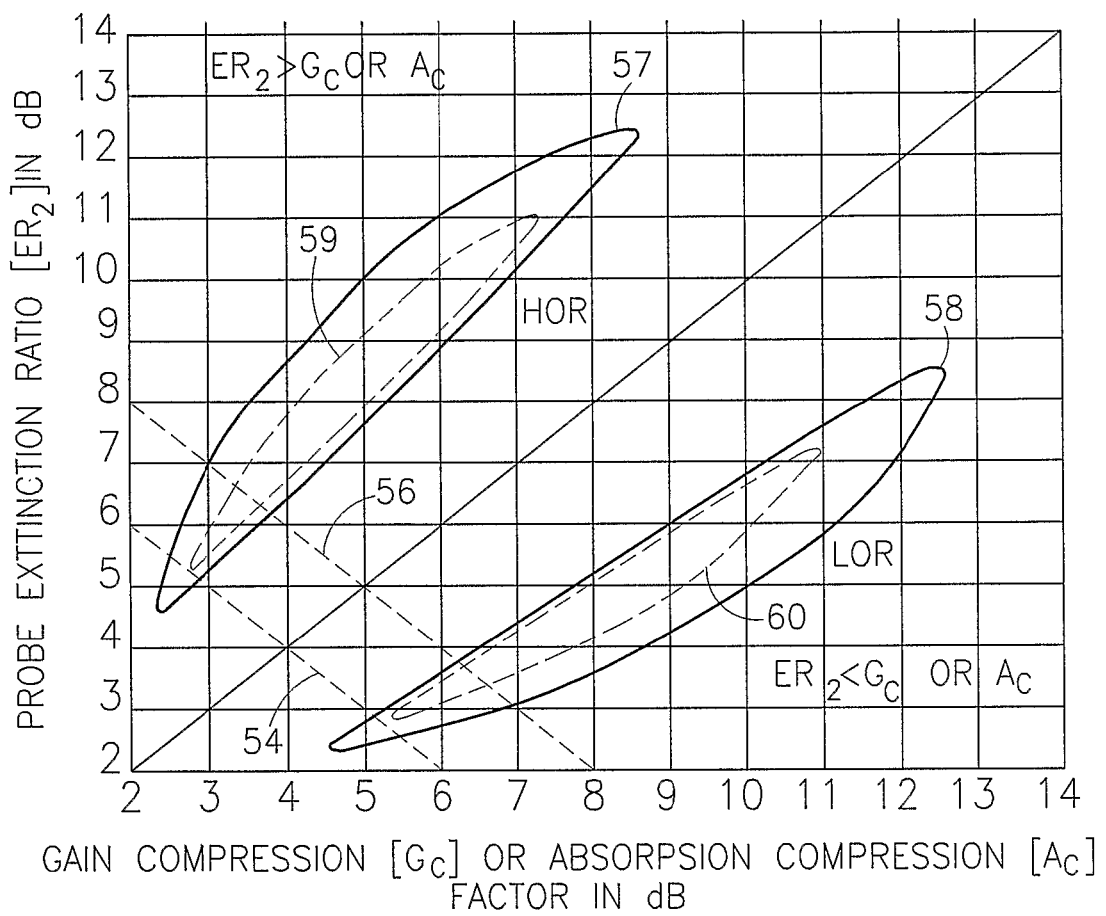
FIG. 10 shows an example of determining optimal combinations of the probe extinction ratio value (ER2) and the compression parameter value (gain compression GC or absorption compression AC), (also for the case where the probe signal itself does not cause saturation of the nonlinear medium).

FIG. 10 illustrates how two optimal working regions can be found, for effective regulation of the proposed system generating a 4-ASK optical signal, (the exemplary regions are given for the case where the probe signal itself does not cause saturation of the nonlinear medium).

In both the XGM and XAM approach, the generated M-ASK (preferably, a 4-ASK) signal exhibits a non-uniform level distribution. This constitutes an advantage in amplified noise limited optical systems. Indeed, the main limitation in optical fiber systems is due to the noise of the optical amplifier that limits the transmission distance. The noise power becomes stronger when the signal power grows. As a result, in a multilevel signal high levels will have much more noise than lower levels. As a consequence, greater gap spaces are needed between the high levels than between the low levels.

However a tradeoff exists between the space between the upper levels and the space between the lower levels of the 4-ASK signal. Careful attention should be paid when selecting the optimized levels' distribution to allow a large enough opening of the lower eye of the 4-ASK signal: the detected intermediate levels $L_1$ and $L_2$ (see FIGS. 5b-5e) should be higher than the optical receiver sensitivity.

As has been mentioned, the Inventors have found that the discussed optimal ratios between levels of the multilevel optical signal can be obtained by selecting adequate combinations of the probe extinction ratio $ER_2$ and the compression parameter (the gain compression Gc or the absorption compression Ac).

The adequate combinations are found in two general working regions, in one of them the compression parameter is higher than $ER_2$ (the upper triangle of FIG. 10) while in the other one the compression parameter is lower than $ER_2$ (the lower triangle of FIG. 10).

To judge about quality of the system, some conditions are to be satisfied and checked, for example:
  The system should have a predetermined minimal sensitivity to the detected optical power at the receivers,
  The system should ensure a predetermined minimal acceptable extinction ratio of the multilevel optical signal
  The system should guarantee a predetermined minimal value of OSNR (optical signal to noise ratio) at the receiver side.

The minimal required OSNR can be selected as such enabling to obtain BER of each detected data stream (for example, Data 1, Data 2 see FIGS. 7, 9) lower than a preselected threshold, for example being 2×10-3.

Obtaining $BER>2\times10^{-3}$ for both of the detected data streams Data1 and Data2 means that upon utilizing the operation of forward error correction (FEC), BER of $2\times10^{-3}$ is typically converted to BER less than $1\times10^{-15}$.

For the system having a predetermined sensitivity at the receiver side, a diagram similar to that shown in FIG. 10 can be built. A predetermined minimal acceptable extinction ratio of the multilevel optical signal is indicated as a dotted line 54 (or 56).

When the diagram is built, exemplary combination(s) of the compression parameter and the $ER_2$ can be selected above the dotted line.

The system can be controlled according to the selected combination(s), to check whether the predetermined minimal acceptable extinction ratio of the multilevel optical signal is achieved, and whether the required OSNR value is obtained.

An exemplary diagram of optimal working regions (for getting combinations of values of the probe extinction ratio ER2, and the gain or absorption compression, GC or AC) is built in FIG. 10, for a 4-ASK signal at a baud (symbol) rate of 10.7 Gsymbol/s, having OSNR=16 dB.

Two exemplary values of minimal acceptable extinction ratio for the 4-ASK signal are shown as dotted lines: $ER_{(4-ASK)}=8$ dB (line 54) and $ER_{(4-ASK)}=10$ dB (line 56).

The optimal working regions are calculated/built for the signal with OSNR of 16 dB enabling a maximum BER of $2\times10^{-3}$ for Data1 and Data2, and for two different values of detected optical power at the receiver Pdec. Namely, For Pdec=−13 dBm optimal working regions 57 and 58 are built;

For Pdec=−15 dBm, optimal working regions 59, 60 are built.

It can be seen that, at one and the same OSNR value of the multilevel signal, the optimal working regions 57, 58 for the detector sensitivity Pdec=−13 dBm are broader than those (59, 60) for the sensitivity Pdec=−15 dBm.

For each specific sensitivity, FIG. 10 shows two symmetrical optimal working regions, the lower optimal region LOR corresponding to the case where $ER_2<Gc$ or Ac, while the second (higher) optimal region HOR corresponds to the case where $ER_2>G_C$ or $A_C$.

In practice, for a 4-ASK multilevel signal, there are two different preferable working regimes:

In the case of Pdec=−15 dBm, for low to moderate extinction ratio ER2 of the probe signal (e.g., for a range from about 3 to about 7 dB) the corresponding compression ratio (gain or absorption) should be selected somewhere between values of about 5.5 to 11, forming the lower optimal region LOR;

Reciprocally, in the case of Pdec=−15 dBm for moderate to high extinction ratio ER2 of the probe signal (e.g., for a range from about 5.5 to about 1 dB), the corresponding compression ratio (gain or absorption) should be found somewhere between values of about 3 to 7, forming the higher optimal region HOR;

Graphically, the two optimal working regions HOR and LOR look like two elongated symmetrical areas formed close to centers of the triangles created by a bisectrix of the quadrant formed by two orthogonal axes shown in FIG. 10. As can be seen, there is an overlapping range of the $ER_2$ values, which can be served by either a lower or a higher optimal region.

Figure 11:
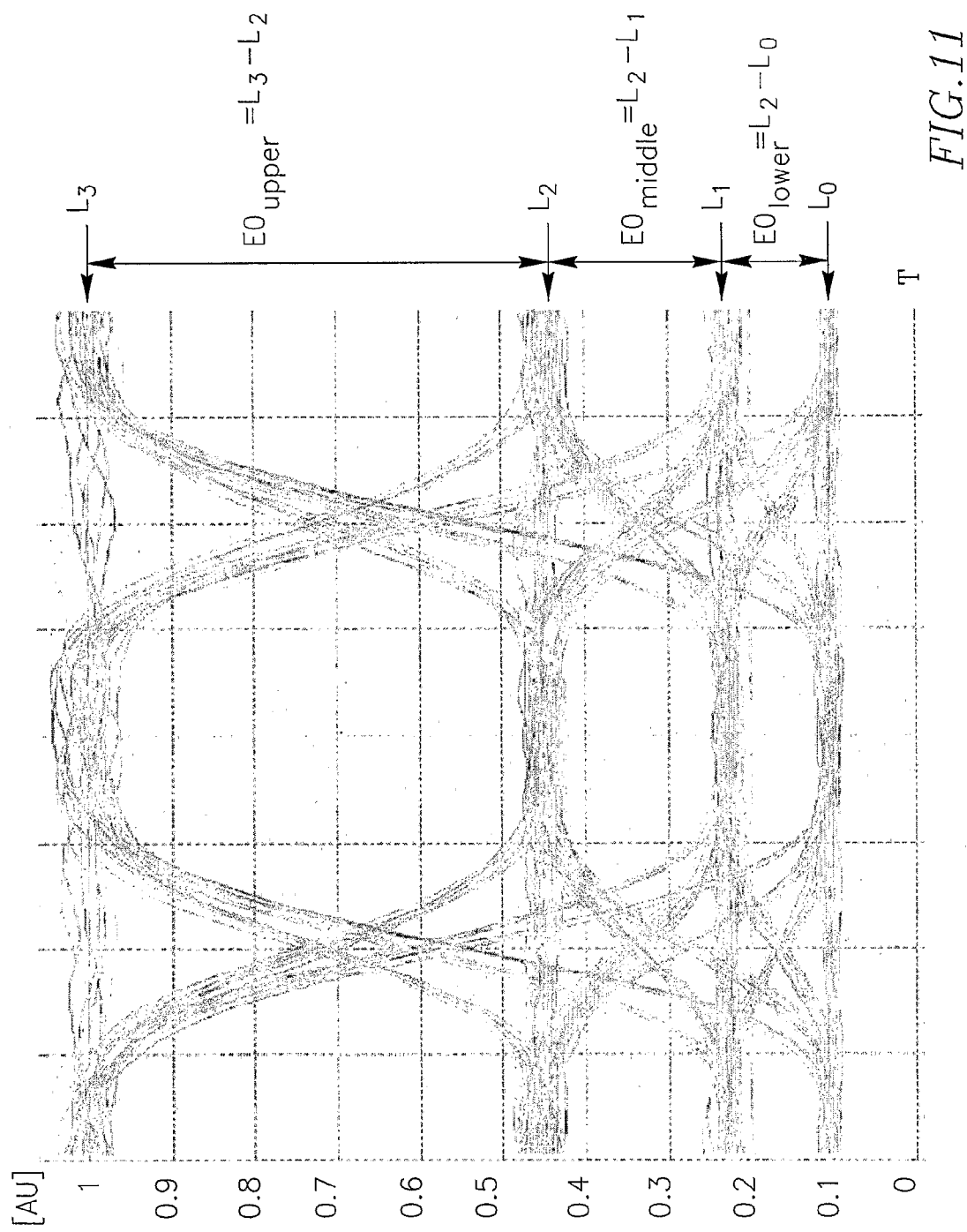
FIG. 11 is an exemplary eye diagram of an optical NRZ 4-ASK signal obtained according to the invention, in the case the probe signal itself does not lead to saturation of the non-linear medium.

An example of an optimized non-uniform relative level distribution for a NRZ 4-ASK signal is shown in FIG. 11 in the form of a so-called eye diagram (we assume that the probe signal power itself does not saturate the nonlinear medium). This eye diagram is composed from three eye diagrams named a lower, a middle and an upper eye diagrams, each one with an eye opening (EO) defined as $EO_{lower}=L_1-L_0$, $EO_{middle}=L_2-L_1$ and $EO_{upper}=L_3-L_2$.

The example of FIG. 11 is obtained by utilizing either one of the optimal areas shown in FIG. 10, and is given in arbitrary units (marked as AU).

The presented exemplary signal can be obtained at $ER_2=3.5$ dB and $G_C$(or $A_C$)=6.5 dB, or $ER_2=6.5$ dB and $G_C$ (or $A_C$)=3.5 dB. The obtained levels are spaced as follows: {0.1, 0.22, 0.45, 1}.

Figure 12A:
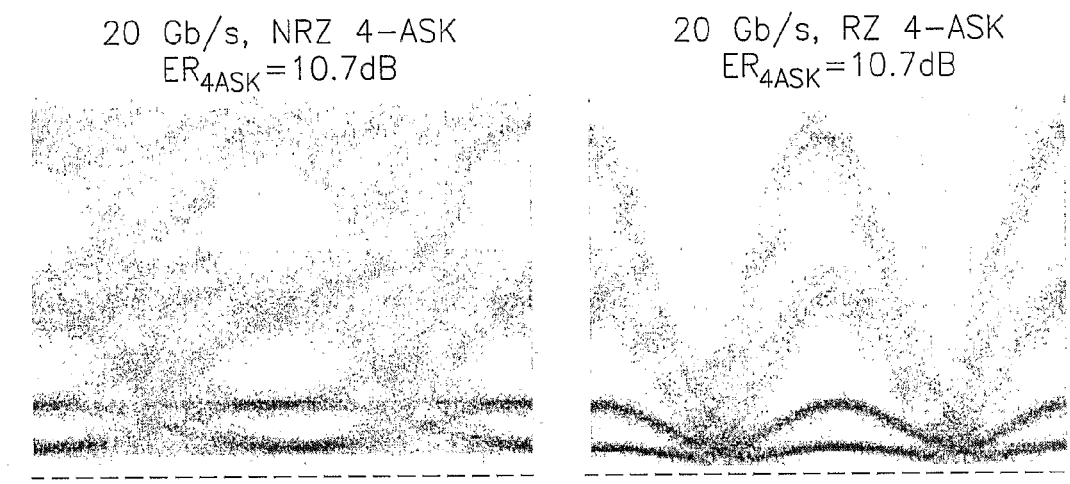
FIGS. 12a, 12b present experimental, detected eye diagrams of an optical 4-ASK signal obtained according to the invention, for the case of XGM in a SOA and with the probe signal causing itself some level of saturation in the SOA.
Figure 12B:
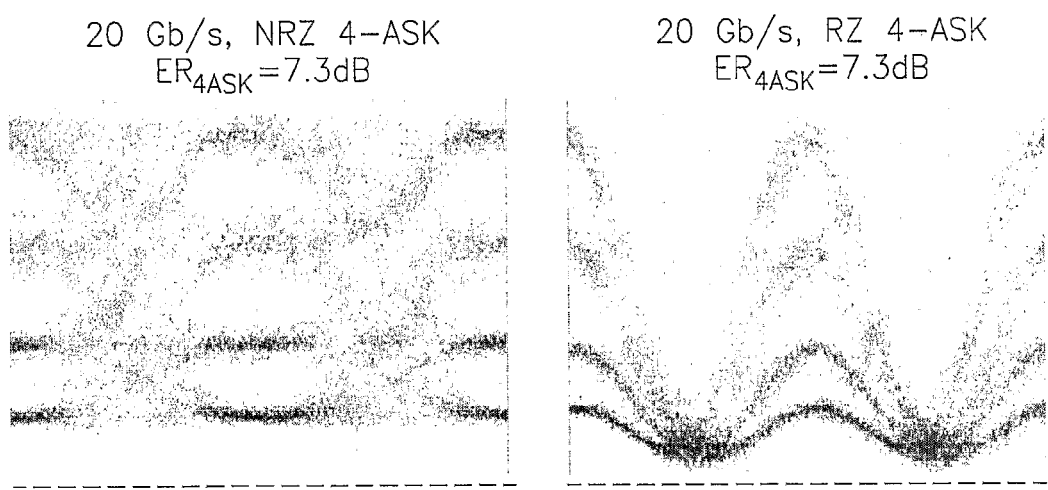

FIGS. 12a and 12b present experimental (detected) eye diagrams of 20 Gb/s 4-ASK signals for two different extinction ratio values and two respective different relative level of the multilevel signal. The two different extinction ratios of the 4-ASK signal and its level distributions are obtained by using different probe extinction ratios and power levels as well as different pump power levels. Each of the figures presents RZ and NRZ multilevel signals. All the diagrams are obtained for the case of XGM in a SOA, for $ER_2<G_C$. It is very important to mention that all the diagrams of FIGS. 12a, 12b are built for the probe signal power slightly saturating, by itself, the non-linear medium. Indeed, in the case of "non-saturating" probe signal's power as shown in FIG. 11, the opening of the lower and upper eye diagrams, $EO_{lower}$ and $EO_{upper}$ is improved at the expense of the opening of the middle eye, $EO_{middle}$. However, when $P_3$ of the probe signal saturates the SOA, it is possible to increase $EO_{lower}$ by increasing $ER_2$ while keeping $EO_{middle}$ and $EO_{upper}$ sufficiently large. Indeed, in such a case, the probe ER at the output of the SOA is reduced, even in presence of a pump power level, $P_0$. This extinction ratio compression is enhanced in presence of a pump power level, $P_1$. Therefore, increasing of the input probe signal's $ER_2$ will lead to a greater opening at the lower eye than at the upper eye. The dashed lines at the bottom of the figures represent the dark reference level of the photo detector.

FIG. 12a shows eye diagrams of the NRZ and RZ 4-ASK signals with the relative level distribution {0.085, 0.23, 0.52, 1}, both of the signals presenting a high extinction ratio $ER_{4-ASK}$=10.7 dB. The non-uniform level distribution in the signals is obtained using $ER_2$=5.6 dB and $G_c$=7 dB.

FIG. 12b shows eye diagrams of the NRZ and RZ 4-ASK signals with the relative level distribution {0.18, 0.38, 0.68, 1}, both of the signals presenting a moderate extinction ratio $ER_{4-ASK}$=7.3 dB, which is especially suitable for combination with phase shift keying modulation schemes, in order to obtain higher spectral efficiency. For this moderate ER, it is preferable to obtain a nearly uniform level distribution and in this present case it is obtained using $ER_2$=3.5 dB and $G_c$=4.3 dB.

Thus, the experimental data presented in FIGS. 12a, 12b, indicate that the method and apparatus of the present invention enables achieving various level distributions as well as various values of extinction ratios, for both NRZ and RZ 4-ASK signals.

The additional advantage of the probe power induced saturation is in that it enables improving the lower eye opening $EO_{lower}$, while keeping $EO_{middle}$ and $EO_{upper}$ sufficiently large.

Figure 13A:
FIGS. 13a-13c present experimental detected eye diagrams of an optical 4-ASK signal obtained, according to the invention, for three different levels of chromatic dispersion in the transmission line. For each level of chromatic dispersion, an NRZ and RZ 4-ASK eye diagrams are presented. All the presented 4-ASK signals are obtained by XGM in a SOA, with the probe signal causing by itself some level of saturation in the SOA.
Figure 13A:
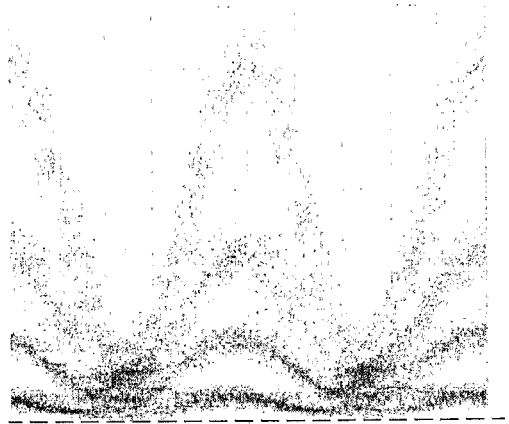
Figure 13B:
Figure 13B:

FIGS. 13a and 13b present a comparison of experimental detected eye diagrams of 20 Gb/s NRZ and RZ optical 4-ASK signals obtained, according to the invention, at two selected levels of accumulated chromatic dispersion in the transmission line. All the diagrams are obtained for the case of XGM in a SOA, with the probe signal power leading (solely) to some level of saturation. The results are presented for NRZ and RZ 4-ASK signals obtained with the relative level distribution {0.18, 0.38, 0.68, 1} and extinction ratio $ER_{4-ASK}$=10.7 dB.

FIG. 13a shows eye diagrams of 20 Gb/s NRZ and RZ 4-ASK signals for the accumulated anomalous dispersion of 165 ps/nm. The NRZ 4-ASK signal presents a distorted eye diagram, with the strongly narrowed middle and lower "eyes", while the RZ 4-ASK signal presents a clear and "open" eye diagram.

FIG. 13b shows eye diagrams of 20 Gb/s NRZ and RZ 4-ASK signals for the accumulated anomalous dispersion of 350 ps/nm The NRZ 4-ASK signal presents a distorted eye diagram with the completely closed upper, middle and lower "eyes", while the RZ 4-ASK signal presents a sufficiently open eye diagram.

Figure 13C:
Figure 13C:
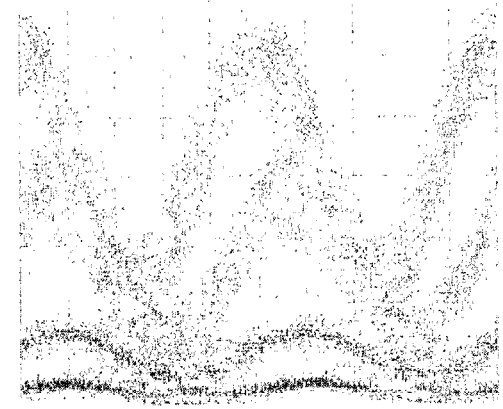

FIG. 13c shows eye diagrams of 20 Gb/s NRZ and RZ 4-ASK signals for the accumulated normal dispersion of −165 ps/nm. The NRZ 4-ASK signal presents a distorted eye diagram with a strongly narrowed upper eye, while the middle and the lower eye openings are enhanced. The diagram of the RZ 4-ASK signal still presents clear openings at the upper, middle and lower eyes.

Thus, the experimental data presented in FIGS. 13a-13c indicates that the technique of the present invention allows achieving various degrees of the dispersion distance tolerance, depending on the selected NRZ or RZ line coding. In the present example, the RZ 4-ASK signal exhibits a better dispersion tolerance in comparison to the NRZ 4-ASK signal.

Indeed, in some nonlinear media such as SOA, the main issue in the XGM based process is the large amount of frequency chirp induced by the large carrier density variation that reduces the dispersion distance tolerance. When the pump signal and the probe signal are used with NRZ line coding, the strong pump power variation at the leading and trailing edges causes large amount of frequency chirp at the leading and trailing edges of the NRZ probe signal, which reduces the dispersion distance tolerance.

When the probe signal is used with RZ line coding while the pump signal uses NRZ line coding, the resulting RZ 4-ASK signal less suffers from the frequency chirp, owing to the RZ probe signal coding. The large frequency variation caused by the strong power variation at the leading and trailing edges of the pump signal are not transposed into the RZ probe signal.

It should be appreciated that other versions and embodiments of the described technique can be proposed and are to be considered part of the invention as far as being defined by the claims, which follow.

The invention claimed is:

1. A system for generating an M-level coded optical signal using M-ASK all-optical modulation technology, the system comprising:
   N sources for obtaining N respective 2-ASK modulated pump optical signals having similar values of extinction ratio $ER_1$,
   a source for obtaining a binary modulated probe optical signal with extinction ratio $ER_2$,
   control means for controlling said N pump optical signals or/and said probe optical signal, wherein said control means are utilized at least for controlling the extinction ratio $ER_2$ of the probe optical signal;
   a non-linear medium for generating said M-level coded optical signal, by performing either Cross-Gain Modulation (XGM) or Cross-Absorption Modulation (XAM) with a respective compression parameter Gc or Ac, when applying to said medium N said 2-ASK modulated optical pump signals and the binary modulated probe optical signal,
   wherein:
   $M=2^K$,
   K is an integer greater than 1,
   N=K−1.

2. The system according to claim 1, being a system for generating a 4-level optical signal using 4-ASK all-optical modulation technology, wherein M=4, N=1.

3. The system according to claim 2, for generating a 4-ASK optical signal being said M-level coded optical signal, wherein said control means are designed for:
   selecting said optimal combination of a value of the probe signal extinction ratio $ER_2$ and a corresponding value of the compression parameter Gc or Ac, the combination being selected in one of two working regions, wherein in one of said working regions the compression parameter is higher than $ER_2$, while in the other of the working regions the compression parameter is lower than $ER_2$, wherein both the compression parameter and $ER_2$ are measured in dB;

encoding the 4-ASK optical signal in accordance with the selected working region; and regulating the system in accordance with the selected combination.

4. The system according to claim 3, where said two optimal working regions are graphically presentable in the form of elongated areas formed close to centers of two triangles created by a bisectrix of a quadrant formed by values of the extinction ratio $ER_2$ on one axis and the compression parameter on the orthogonal axis, said elongated areas being mutually symmetrical with respect to the bisectrix and situated higher than a line of a minimal acceptable extinction ratio of the 4-ASK optical signal.

5. The system according to claim 2, wherein the pump signal and the probe signal are obtained at two respective wavelengths at said two respective sources, and wherein the control means is adapted:

to specify at which of the two wavelengths and at which of the two sources the probe signal is to be obtained;

to control one or both of said optical signals to ensure that the signal provided at the specified wavelength and at the specified source is said probe signal.

6. The system according to claim 2, wherein the non-linear medium is SOA and the 4-ASK coded optical signal is a return-to-zero (RZ) 4-ASK coded optical signal, thereby increasing dispersion distance tolerance of the 4-ASK signal.

7. The system according to claim 6, utilizing non-return-to-zero (NRZ) said pump optical signals and return-to-zero (RZ) said probe optical signal.

8. The system according to claim 2, designed so that the probe optical signal causes saturation of the non-linear medium, while said saturation being always lower than the saturation caused by the pump optical signal; the system being further controllable to optimize opening of an eye diagram of the 4-ASK coded optical signal.

9. The system according to claim 1, wherein said control means are designed for controllably regulating the extinction ratio $ER_2$ in combination with a value of compression parameter of the non-linear medium, and adapted to controllably select an optimal combination of the extinction ratio $ER_2$ value and a value of said compression parameter Gc or Ac of the non-linear medium.

10. The system according to claim 9, further comprising a decoder for decoding the 4-ASK optical signal in response to information concerning the combination between a value of $ER_2$ value and a value of said compression parameter selected for encoding said 4-ASK optical signal.

11. A method for producing an M-level optical signal using M-ASK all-optical modulation technology, the method comprising steps of:

obtaining N 2-ASK modulated pump optical signals having similar values of extinction ratio $ER_1$;

obtaining a 2-ASK modulated probe optical signal having extinction ratio $ER_2$;

controlling at least one of said N pump optical signals and said probe optical signal by at least controlling the extinction ratio ER2 of the probe optical signal;

combining the N 2-ASK modulated optical pump signals and the 2-ASK modulated probe optical signal in a non-linear medium to obtain said M-level coded optical signal, wherein:

$M=2^K$,

K is an integer greater than 1,

N=K−1, and wherein the non-linear medium is capable of performing either cross-gain modulation (XGM) or cross-absorption modulation (XAM), and is characterized by a compression parameter being Gain compression Gc and Absorption compression Ac respectively.

* * * * *